US007864631B2

(12) United States Patent
Van Leest et al.

(10) Patent No.: US 7,864,631 B2
(45) Date of Patent: Jan. 4, 2011

(54) METHOD OF AND SYSTEM FOR DETERMINING DISTANCES BETWEEN LOUDSPEAKERS

(75) Inventors: Adriaan Johan Van Leest, Eindhoven (NL); Daniel Willem Schobben, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 509 days.

(21) Appl. No.: 11/916,552

(22) PCT Filed: Jun. 7, 2006

(86) PCT No.: PCT/IB2006/051818

§ 371 (c)(1),
(2), (4) Date: Dec. 5, 2007

(87) PCT Pub. No.: WO2006/131893

PCT Pub. Date: Dec. 14, 2006

(65) Prior Publication Data

US 2010/0135118 A1 Jun. 3, 2010

(30) Foreign Application Priority Data

Jun. 9, 2005 (EP) .................................. 05105089

(51) Int. Cl.
*G01S 3/80* (2006.01)

(52) U.S. Cl. ...................................................... 367/124

(58) Field of Classification Search ................. 367/127, 367/124

See application file for complete search history.

(56) References Cited

U.S. PATENT DOCUMENTS 5,386,478 A 1/1995 Plunkett (Continued)

FOREIGN PATENT DOCUMENTS

| | | | |
|---|---|---|---|
| EP | 0989776 | A2 | 3/2000 |
| EP | 1443804 | A2 | 8/2004 |
| JP | 08271627 | A | 10/1996 |
| JP | 10253745 | | 9/1998 |

(Continued)

OTHER PUBLICATIONS

Joncour et al: "A Unique and Strict Identification of the Echo Path Impulse Response in Stereo Echo Cancellation"; The Institute of Electronics, Information and Communication Engineers, IEICE Technical Report, DSP96-100, 1996, pp. 17-24, XP009008855.

(Continued)

*Primary Examiner*—Dan Pihulic

(57) ABSTRACT

The invention describes a method of determining the distance ($d_{12}$) between two loudspeakers ($L_1$, $L_2$), wherein the method comprises the steps of providing a test signal (N), combining the test signal (N) with a sound signal (S) to give a combined signal (SN) in which the test signal is imperceptible to a listener (4), and issuing the combined signal (SN) by means of a first loudspeaker ($L_1$). The combined signal (SN) is detected by a detecting means ($M_2$) associated with the second loudspeaker ($L_2$) and processed to obtain an acoustic impulse response (IR), which is used to determine the distance ($d_{1,2}$) between the first loudspeaker ($L_1$) and the second loudspeaker ($L_2$). The invention further describes a system (1) for determining the distance ($d_{1,2}$) between two loudspeakers ($L_1$, $L_2$) and an acoustic sound system, comprising a number of loudspeakers ($L_1, L_2, \ldots, L_k$) for reproduction of multi-channel sound, and a system (1) for determining the distances ($d_{1,2}, d_{2,3}, \ldots, d_{k-i,k}$) between the loudspeakers ($L_1, L_2, \ldots, L_k$) in order to automatically configure the loudspeakers ($L_1, L_2, \ldots, L_k$) for that acoustic sound system.

13 Claims, 5 Drawing Sheets

U.S. PATENT DOCUMENTS

| | | | | |
|---|---|---|---|---|
| 5,666,424 | A | 9/1997 | Fosgate et al. | |
| 6,347,148 | B1 | 2/2002 | Brennan et al. | |
| 2002/0136414 | A1 | 9/2002 | Jordan et al. | |
| 2003/0031333 | A1 | 2/2003 | Cohen et al. | |
| 2004/0071294 | A1 | 4/2004 | Halgas et al. | |
| 2004/0151476 | A1 * | 8/2004 | Suzuki | 386/96 |
| 2005/0244012 | A1 * | 11/2005 | Asada | 381/56 |
| 2009/0192638 | A1 * | 7/2009 | Van Leest et al. | 700/94 |
| 2010/0135118 | A1 * | 6/2010 | Van Leest et al. | 367/124 |

FOREIGN PATENT DOCUMENTS

| | | | |
|---|---|---|---|
| TW | 533746 | | 5/2003 |
| WO | WO0076266 | A2 | 12/2000 |
| WO | WO0182650 | A2 | 11/2001 |
| WO | WO03088711 | A2 | 10/2003 |
| WO | WO2004047484 | A1 | 6/2004 |
| WO | WO 2006131893 | A1 * | 12/2006 |

OTHER PUBLICATIONS

Painter et al: "Perceptual Coding of Digital Audio"; Proceedings of the IEEE, vol. 88, No. 4, Apr. 2000.

The Convention Paper 6211 of the Audio Engineering Society (117TH Convention).

Gunel, B.: "Loudspeaker Localization Using B-Format Recordings"; 2003 IEEE Workshop on Applicaiton of Signal Processing to Audio and Acoustics, pp. 59-62, Oct. 19-22, 2003, New Paltz, NY.

Pulkki et al: Creating Auditory Displays With Multiple Loudspeakers Using VBAP: A Case Study With Diva Project. ICAD 1998, pp. 1-5.

Torgerson, W.: "Multidimensional Scaling: I. Theory and Method"; Psychometrika, vol. 17, No. 4, pp. 401-419, Dec. 1952.

* cited by examiner

State of the art

METHOD OF AND SYSTEM FOR DETERMINING DISTANCES BETWEEN LOUDSPEAKERS

FIELD OF THE INVENTION

The invention relates to a method of determining the distance between two loudspeakers, and to a system for determining the distance between two loudspeakers.

The invention also relates to a method of determining the relative positions of the loudspeakers of a group of loudspeakers and to a method of automatic configuring of a group of loudspeakers.

Furthermore, the invention relates to an acoustic sound system.

BACKGROUND OF THE INVENTION

Present-day surround sound systems often feature a number of loudspeakers, which should be positioned strategically around a listener in a room so that the listener is given the impression that the sound emanating from the loudspeakers originates from all around, or that a particular sound such as a voice originates from a virtual source, e.g. from a point to the left of the listener. These sound effects rely on a correct positioning of the loudspeakers, since it is the interaction of the lobes of sound originating from each loudspeaker that ultimately delivers the desired listening experience.

To assist the user in configuring—or placing—the loudspeakers correctly, present-day sound systems sometimes offer colour-coded connectors and sockets, i.e. the colour of the connector originating from, for example, the amplifier, matches the colour of the socket on the back of the loudspeaker. In practice it remains difficult for many users to perform the setup correctly, so that the speakers might be incorrectly placed about the room with respect to the television set. For example, the user might mistakenly connect the left surround speaker where the right surround speaker should be connected, or might entirely forget to connect a loudspeaker. Such an error significantly diminishes the quality of the combined audio and video experience, since the perceived sounds can appear to come from the "wrong" direction in relation to that which is seen on screen. The result of such configuration errors is that some of the listening effects might fail to be reproduced correctly, resulting in dissatisfaction on the part of the user of the sound system. Even if the loudspeakers are correctly connected, their placement about the room might still not satisfy requirements for the reproduction of the surround sound effects and a "sweet spot"—the area within a group of loudspeakers in which the sound is heard at its best. For example, the loudspeakers might be placed too far apart or too close together. Ultimately, it can be seen that the correct connection and placement of loudspeakers for a surround sound system is quite often beyond the capabilities of many of the owners of such systems.

In an attempt to address this problem, some systems comprise a configuration feature to configure the loudspeakers, once they have been connected, in an effort to give the listener a satisfactory listening experience. Such configuration systems attempt to determine the distances between the loudspeakers, since, when these distances are known, the sound system can optimise the signals to the line inputs of the loudspeakers. For example, US 2003/0031333 discloses a system for optimisation of audio reproduction, by having the user hold a portable sensor which detects the sound signals emanating from the loudspeakers, and transmits a signal to a processor which then optimizes the loudspeaker sound for the position at which the user is seated. However, this system requires active assistance on the part of the user. Furthermore, the user is compelled to have the portable (battery-operated) sensor at hand every time the position of a loudspeaker is changed, or whenever the user chooses to sit in a different position in the room. Should the sensor be misplaced at some point in time, the user can no longer initiate an optimisation of the loudspeaker sound. This proposed system offers no solution in the event of incorrect or missing loudspeaker connections.

In other proposed solutions, the distances between the loudspeakers are measured by causing test signals to emanate from the loudspeakers, and picking up the test signals by an array of microphones associated with the loudspeakers. The Convention Paper 6211 of the Audio Engineering Society ($117^{th}$ Convention) suggests an approach in which each loudspeaker is equipped with two dedicated microphones. A test signal is emitted by each loudspeaker in turn and is detected by the microphones of the remaining loudspeakers. However, a major disadvantage of this approach is that the test signal of the proposed system is issued in a separate setup procedure and can be heard by the user. Since it is necessary to perform the configuration as a separate process, the user must initiate the configuration, perhaps by means of a command given by the remote control of the tuner. However, since the user would probably have to consult the manual to determine the input command, he might not be inclined to carry out the configuration at all.

For many consumers, such configuration systems are simply too complicated and are perceived to be annoying, with the result that the user does not avail of them, or does not carry out the steps correctly, ultimately resulting in his dissatisfaction with the sound system.

OBJECT AND SUMMARY OF THE INVENTION

Therefore, an object of the present invention is to provide an easy and economical way of automatically measuring the distances between loudspeakers of a sound system during operation of the sound system, which can be carried out at any time without effecting normal operation and without disturbing the user.

To this end, the present invention provides a method of determining the distance between two loudspeakers, wherein the method comprises the steps of providing a test signal; combining the test signal with a sound signal to give a combined signal in which the test signal is imperceptible to a listener; issuing the combined signal by means of a first loudspeaker; detecting the combined signal by a detecting means associated with the second loudspeaker; processing the detected combined signal to obtain an acoustic impulse response; using the acoustic impulse response to determine the distance between the first loudspeaker and the second loudspeaker.

The signal with which the test signal is being combined is generally the audio signal which is sent to a loudspeaker via the line input to that speaker. A typical sound system might comprise several line inputs, generally one for each speaker. The elements of the audio which might be accompanying a movie, for example, might comprise any or all of voice, music and sound effects. In the following, when reference is made to a "sound signal" or "audio signal", it is the signal carried via the line input that is implied. The method of determining the distances between speakers is preferably carried out when all loudspeakers are actively being supplied with sound signals, such as when the listener is enjoying an audio-visual movie experience.

An appropriate system for determining the distance between two loudspeakers comprises a test signal source for providing a test signal; a signal combining unit for combining a sound signal with the test signal to give a combined signal in which the test signal is imperceptible to a listener; outputting means for outputting the combined signal to a first loudspeaker; a detecting means for detecting the combined signal emanating from the first loudspeaker and incident at the second loudspeaker; a processing unit for processing the detected combined signal to obtain an impulse response; a distance determination unit for using the impulse response to determine the distance between the first loudspeaker and the second loudspeaker.

A clear advantage of the method according to the invention is that the measurement of the distances between the loudspeakers can take effect completely automatically, without being noticed in any way by the user, and can be carried out at any time, regularly or intermittently, so that any deliberate or accidental re-arrangement of the loudspeakers can be detected and compensated for.

The dependent claims and the subsequent description disclose particularly advantageous embodiments and features of the invention.

A number of methods exist for embedding a test signal into a "host" signal. According to the invention, a test signal preferably comprising white noise is combined with the host audio signal, since all frequencies are essentially equally represented in white noise. The noisy test signal can be obtained by being generated as required, or being retrieved from, for example, a memory device. In a particularly preferred embodiment of the invention, such a noisy test signal is imperceptibly combined with the sound signal by applying a technique of psycho-acoustic noise embedding. This technique avails of a psycho-acoustic model, which analyses the sound signals intended for the loudspeakers and accordingly provides information indicating to what degree the signals can be distorted—by combining them with noise—before this distortion becomes perceptible to a listener. To this end, the psycho-acoustic model analyses the sound signals in the frequency domain to determine the intensities of the frequency components of the sound signals. Typically, such audio signals can be distorted more in the low and high frequency regions than in the mid-frequency region without this distortion being noticed by a listener, because human hearing is less sensitive to low and high frequency components. The psycho-acoustic model identifies the areas in the frequency spectrum of the audio signals which may be imperceptibly combined with the test signal, and performs the combination of the audio and test signals. The resulting combined signals carry the test signals in such a way that they are wholly imperceptible to the listener. A known method is described in detail in the paper "Perceptual Coding of Digital Audio" by Ted Painter and Andreas Spanias, Proceedings of the IEEE, VO. 88, No. 4, April 2000.

The combined test and sound signals are thus issued by the first loudspeaker and detected, after a small delay owing to the separation between the loudspeakers, by a detecting means associated with the second loudspeaker. The test signal is used to identify the loudspeaker from which it emanates. The test signal and the detected combined signal can then be processed together to determine the acoustic impulse response of the room between the two loudspeakers, since the test signal is available essentially without any delay, but the detected combined signal has undergone a delay from the moment it is issued from the loudspeaker to the moment it is detected by the detecting means of the second loudspeaker. The basic elements of such an acoustic impulse response, in order of occurrence, are known as the main peak (the first large peak as the sound signal impinges on the detecting means), early reflections (caused by reflections of the sound signal within the room), and a reverberant tail (caused as the sound signal dies out from absorption). The elapsed time until appearance of the main peak yields the most interesting information, since it is essentially the time which elapses from the moment the sound is issued from the first loudspeaker to the moment at which it is detected at the detecting means of the second loudspeaker, and, once computed, this duration can be used to calculate the distance between the loudspeakers, knowing the speed of sound in air.

The following presupposes that any of the described processing steps involving filtering etc., are preceded by a step of analog to digital conversion, if necessary. Whether analog or digital filtering is required at any stage will be clear to a person skilled in the art.

In one preferred embodiment of the invention, the step of processing the test signal and the detected combined signal to obtain the acoustic impulse response comprises performing adaptive filtering on the received combined signal and the test signal to arrive at the acoustic impulse response of the room. Such techniques for adapting a signal to match a version of that signal modified by an unknown system—in this case, the room—are widely available and will be known to a person skilled in the art. The filter coefficients of the adaptive filter are continually adjusted until the output of the adaptive filter cancels the input signal, i.e. becomes the inverse of the detected combined signal, thus indirectly yielding the desired impulse response.

In a further preferred embodiment of the invention, the step of processing the detected combined signal to obtain the acoustic impulse response comprises determining a correlation between the detected combined signal and the test signal. To this end, a Fast Fourier Transformation (FFT) and corresponding conjugate is calculated for the test signal. The detected combined signal is also processed to obtain its FFT. Thereafter, a point-wise multiplication is performed on the conjugate of the test signal and the FFT of the detected combined signal, followed by an inverse Fast Fourier Transformation (IFFT) to yield the impulse response of the room between the first loudspeaker and the detecting means of the second loudspeaker.

Having obtained the impulse response in a manner described above, it is then possible to estimate the distance between the two loudspeakers, since the delay elapsed until occurrence of the first large peak of the impulse response arises due to the distance travelled by the combined signal between the first loudspeaker and the detecting means of the second loudspeaker. Therefore, knowing the delay to the first large peak in samples, and knowing the sampling rate and the speed of sound, it is trivial matter to compute the distance.

It is generally easier to identify a test signal in a combined signal if the test signal is repetitive. Therefore, in a preferred embodiment of the invention, the test signal is periodically repeated in the step of combining the noisy test signal with the sound signal to give the combined signal, giving a repetitive sequence. The period of repetition is preferably chosen to be at least as long as the reverberation time of the room, which is the length of time required for a sound to completely die out. The ensuing pattern, recognised in the processing unit of the system, can be used to directly identify the loudspeaker from which the test signal was issued.

The amplitude of the noise contribution of the test signal is of necessity very low compared to the host audio signal with which it is combined. Therefore, in a further preferred embodiment of the invention, the step of processing the detected combined signal comprises accumulation of the received combined signal, by sampling and storing the detected combined signal in a buffer with the same length as a period of repetition of the test sequence. In this way, the noisy test signal accumulates, whilst the host sound signal can be essentially averaged out. The step of accumulation therefore increases the ratio of the noise to the host, so that the noise contribution of the test signal can be identified more easily. The level of the noisy test signal can therefore easily be kept so low as to be absolutely imperceptible to the listener.

The detecting means for a loudspeaker might be a microphone, or a number of microphones, located in the immediate vicinity of that loudspeaker. For example, such a microphone might be incorporated in the housing of the loudspeaker, so that the distance between the microphone and the membrane or diaphragm of the loudspeaker is kept to a minimum. In existing methods of determining the distances between loudspeakers, the loudspeakers must be specially equipped with a microphone array, so that the user is therefore compelled to purchase such loudspeakers or connect the microphones, and all necessary wiring and leads, to his existing set of loudspeakers. Therefore, in a particularly preferred embodiment of the invention, the actual membrane of the loudspeaker itself might be used to receive the combined signal incident at that loudspeaker. Using the loudspeaker as a microphone in this way is made possible owing to the mechanical properties of the membrane, namely that this can be made to oscillate by a sound signal incident at the membrane. This embodiment therefore offers a particularly attractive realisation, since no additional wiring is required at the loudspeaker itself.

Not every loudspeaker of a group of loudspeakers need have a detecting means assigned to it. It is sufficient for one of each pair of loudspeakers in the group of loudspeakers to be equipped with a detecting means, since only one detecting means is necessary for determining the distance between one pair of loudspeakers. It goes without saying that any suitable combination of detecting means can be implemented. For example, one of the loudspeakers might comprise a single detecting means, whereas some or all of the remaining loudspeakers might be equipped with more than one detecting means. The detecting means for one or more of the loudspeakers might be the membrane or diaphragm of the loudspeaker, whereas microphones might be assigned to some or all of the remaining loudspeakers.

The method of determining the distance between two loudspeakers can be applied to determine all the pair-wise distances between the loudspeakers of a group of loudspeakers, for example the loudspeakers of a surround sound system, typically comprising two front speakers and two rear speakers, with one or more additional loudspeakers such as a subwoofer, central loudspeaker, television loudspeakers, etc. In one embodiment, a single test signal is thus combined with a sound signal, and the resulting combined signal is issued successively by each of the loudspeakers of the group, one after the other, and received by the remaining loudspeakers in the group. The pair-wise distances are determined between the loudspeaker issuing the combined signal and the remaining loudspeakers. Subsequently, one of the other loudspeakers is chosen to issue the combined signal, and the pair-wise distances are determined between this loudspeaker and the remaining loudspeakers. In this way, the pair-wise distances between each of the loudspeakers in the group can successively be determined.

In a particularly preferred embodiment of the invention, the pair-wise distances between the loudspeakers can be measured simultaneously, by having each loudspeaker issue a combined signal comprising a distinct noisy test contribution. The term "distinct" as used here means that the test signals are entirely different from each other, so that each loudspeaker signal can be combined with a distinctive test signal. To this end, a distinct noisy test signal is preferably psycho-acoustically embedded into each sound input for the loudspeakers to give a number of distinct combined signals which are issued essentially simultaneously, one from each loudspeaker of the group, and are received essentially simultaneously by the other loudspeakers of the group. In the processing step described above, correlations are performed successively on the detected signal of a loudspeaker with each test signal, thereby yielding the transfer functions of the loudspeakers associated with the corresponding test signal to all other loudspeakers. In this way, the pair-wise distances between each of the loudspeakers in the group can be determined essentially simultaneously.

Using the method according to the invention, the distances determined between pairs of loudspeakers of a group of loudspeakers can be used to determine the overall constellation of the loudspeakers of the group, i.e. the position of each loudspeaker relative to the others. Knowing the pair-wise distances between the loudspeakers, their relative positions can be deduced by using, for example, a "brute-force" method. In such a brute-force method, the known pair-wise distances are combined in a various ways, in a trial-and-error approach, until a satisfactory solution is obtained. In a preferred embodiment of the invention, however, the pair-wise distances are used as parameters in a technique known as Multi-Dimensional Scaling (MDS) to yield the constellation. This technique will be explained in detail in the description of the Figures.

The information regarding the relative positions of the loudspeakers of the group of loudspeakers, as derived using a method according to the invention, can be used to modify the sound signals before they are issued by the loudspeakers in order to automatically configure the loudspeakers. For example, by "weighting" or increasing the amplitude of a line input to a speaker, it is possible to compensate, for example, for an overly large distance between this speaker and the listener. Equally, a number of sound channels might be weighted and mixed together to correct an erroneous loudspeaker setup. For example, it can be determined, using the method according to the invention, whether or not a loudspeaker is even connected. A missing loudspeaker can then be "replaced" by mixing the sound channel intended for this loudspeaker with the sound channel for one or more other loudspeakers. The information can be used to inform the user in some appropriate way, for example by showing a message in a display area of a home entertainment system. Furthermore, the method according to the invention can be used to determine whether the polarity of the loudspeaker connections or leads is correct or not. In the case of an incorrect connection, the sign—positive or negative—of the first peak of the impulse response will be different from the sign of the impulse response of a loudspeaker with correctly connected leads. An incorrect, inverse polarity can be corrected by, for example, inverting the appropriate sound channel for the line input to this speaker. The invention thus provides a number of powerful and practical ways of improving the quality of sound emanating from the loudspeakers.

An acoustic sound system according to the invention comprises a number of loudspeakers for reproduction of multichannel sound, and a system as described above for determining the distances between the loudspeakers, and a system for automatically configuring for that acoustic sound system, using the distances determined between the loudspeakers. In such an acoustic system, the signal combining unit preferably comprises a psycho-acoustic embedding unit for applying a psycho-acoustic technique to embed the test signal into the sound signal. The signal combining unit and the psycho-acoustic embedding unit might be incorporated in any suitable location in the system, for example in the housing of the amplifier, since the line inputs to the loudspeakers—which will carry the combined signal—typically originate within the amplifier unit, and are thus conveniently placed for modification before being forwarded to the loudspeakers. In a particularly preferred embodiment, one or more of the loudspeakers is used directly as a detecting means, by using the membrane of the loudspeaker as the detecting means for that loudspeaker.

The processing unit of such a sound system might also be directly located in the amplifier housing of the sound system, since all the signals required by the processing unit generally originate or terminate in the amplifier. The processing unit can comprise, as necessary, a correlation unit for determining a correlation between detected combined signal and test signal and/or adaptive filter for performing adaptive filtering on the detected combined signal. Furthermore, such a sound system might comprise an accumulator for accumulating the received combined signal in order to increase the ratio of the test signal contribution to the host signal. The acoustic system according to the invention might also comprise an optimisation unit for using information about the relative positions of the loudspeakers to automatically configure the loudspeakers.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DESCRIPTION OF EMBODIMENTS

Figure 1:
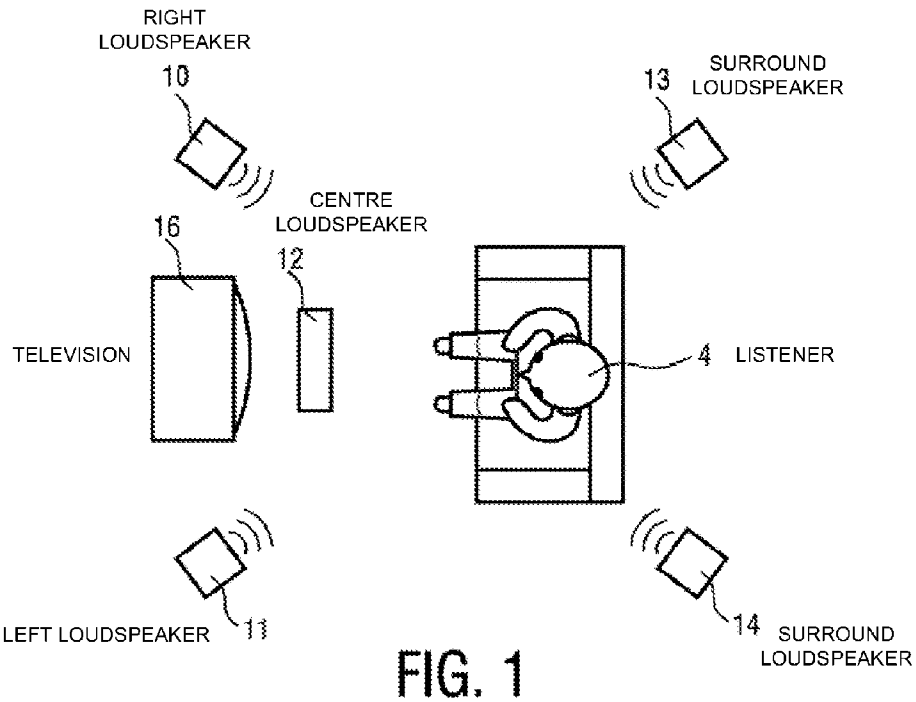
FIG. 1 shows a schematic representation of an audio system according to the state of the art.

In the drawings, like numbers refer to like objects throughout.

FIG. 1 shows a typical loudspeaker setup for an audio or home entertainment system which comprises, in this example, a television 16 and a number of loudspeakers such as a left loudspeaker 11 and a right loudspeaker 10 and a pair of surround loudspeakers 13, 14 distributed about the room. A centre loudspeaker 12 is shown, for the purpose of illustration, at a distance from the television 16, even though such a centre loudspeaker 12 is generally located below the television 16. The television 16 itself might also be equipped with one or more loudspeakers, not shown in the diagram. A listener 4 is shown seated more or less centrally to the loudspeakers 10, 11, 12, 13, 14. Evidently, the loudspeakers 10, 11, 12, 13, and 14 can have been placed at any position in the room, often determined by decorating or physical constraints. Furthermore, the listener 4 need not be seated at a central position. Such a home entertainment system generally also comprises other devices such as a tuner, CD player, DVD player etc., and an amplifier for supplying to the loudspeakers the various sound channel outputs by means of outputting means, which in the present case are realized by connectors to which line inputs to the loudspeakers of the home entertainment system are connected. Such a line input to a loudspeaker is usually a pair of wires or leads which should be connected to the appropriate connectors on the loudspeaker, taking into consideration the correct polarity. However the outputting means can also be realized by wireless transmission or communication means. The loudspeaker can be appropriately equipped contactless cooperation with the outputting means.

Figure 2A:
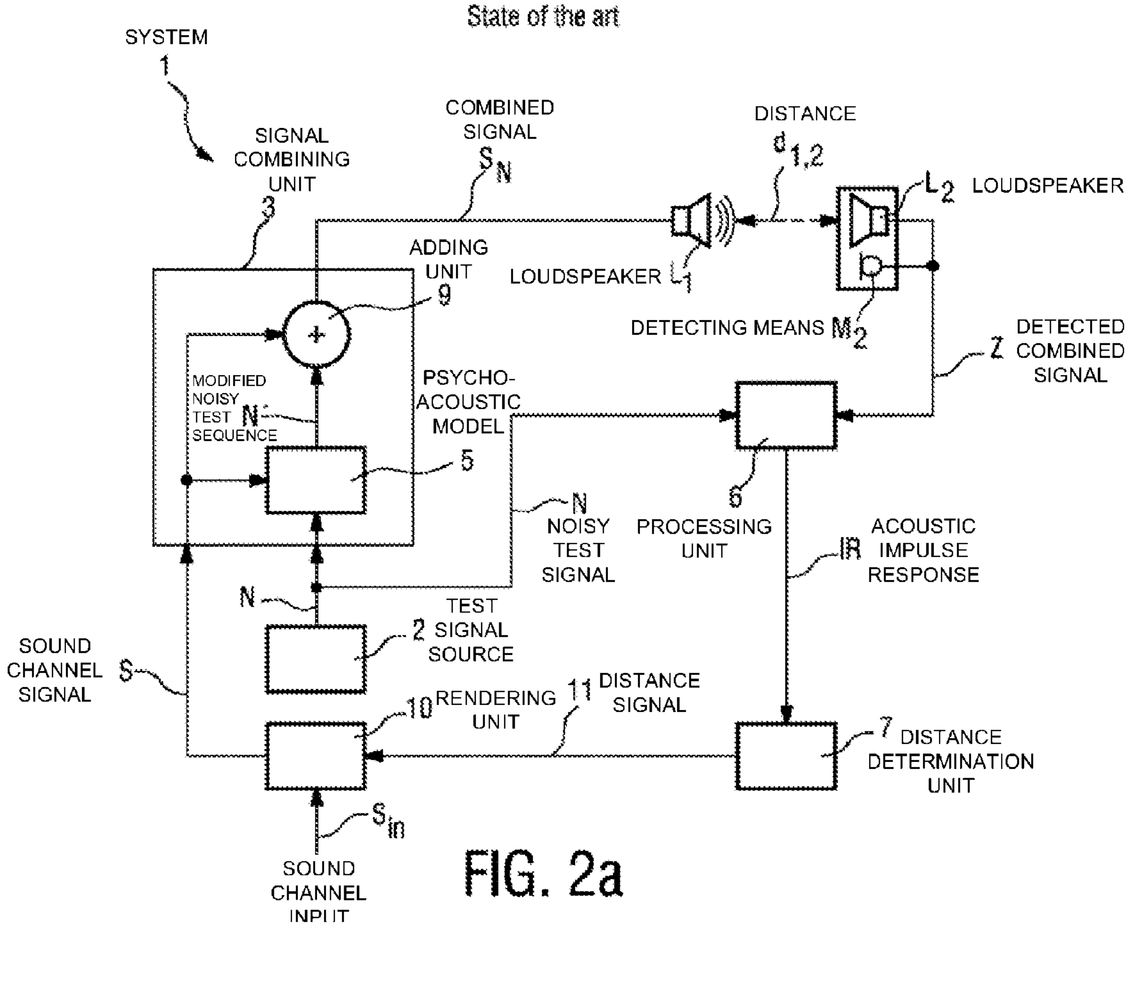
FIG. 2*a* shows a block diagram of a system for determining the distances between a pair of loudspeakers according to an embodiment of the invention.
Figure 2B:
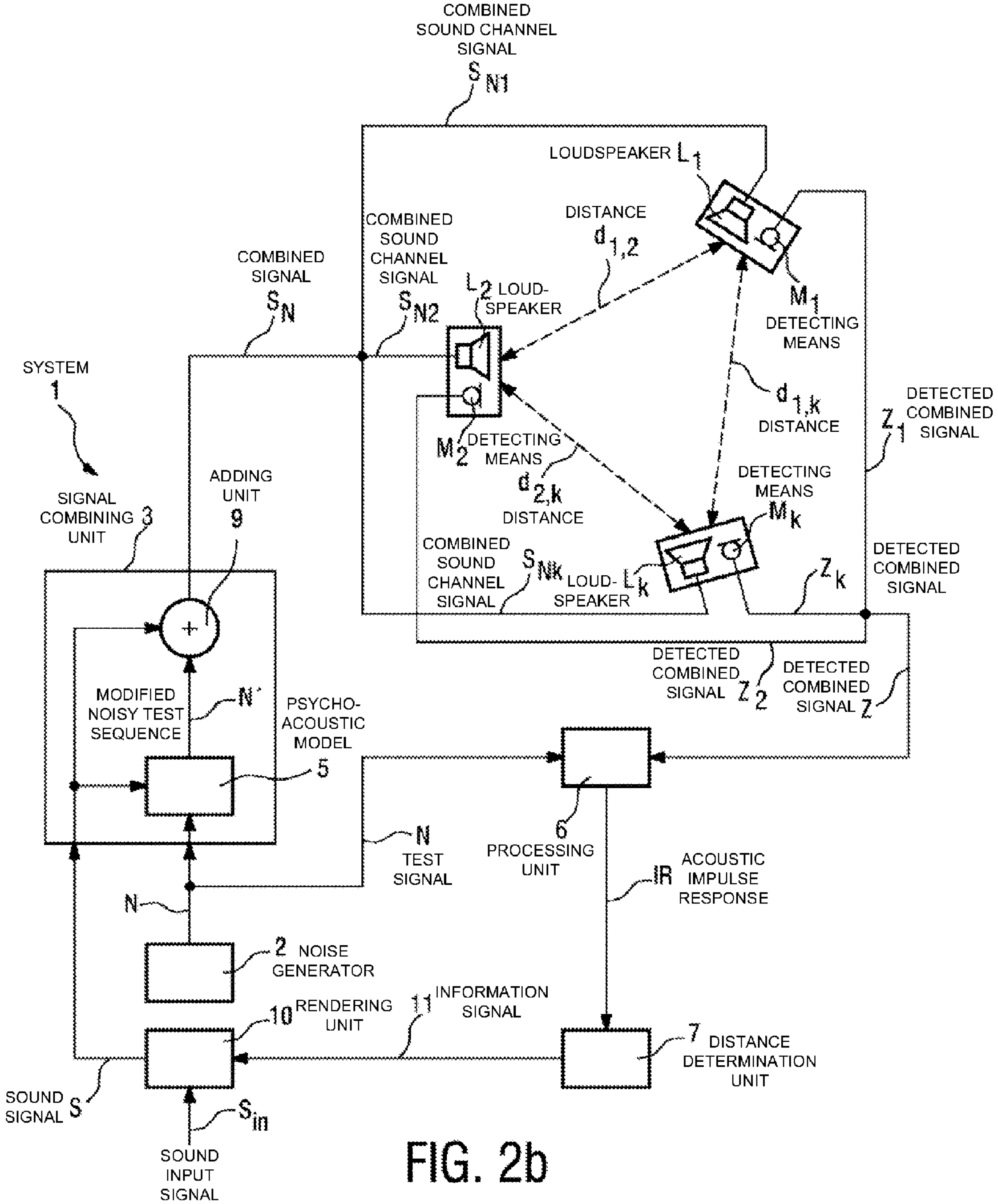
FIG. 2*b* shows a block diagram of a system for determining the pair-wise distances between loudspeakers of a group of loudspeakers according to an embodiment of the invention.

FIG. 2*a* shows a system 1 for determining the distance $d_{1,2}$ between a pair of loudspeakers $L_1$ and $L_2$, to illustrate, in an uncomplicated manner, the steps involved in determining the pair-wise distances between all loudspeakers of a group of loudspeakers, as will be explained in FIG. 2*b* below.

The input to the system 1 is a sound channel $S_{in}$, which sound channel $S_{in}$ is intended for the first loudspeaker $L_1$. The sound channel is processed in a rendering unit 10 and forwarded as a sound channel S to a signal combining unit 3. A test signal source 2 supplies a suitable noisy test signal N to the signal combining unit 3. For example, the test signal N generated by the noise generator 2 can be a pattern or sequence of noise which repeats after a certain length. In the signal combining unit 3, a psycho-acoustic model 5 analyses the input sound signal S to determine its frequency spectrum, identifying any suitable frequency components in the input sound signal S which would be imperceptibly distorted under the addition of white noise, and modifying accordingly the frequency components of the test signal N to give a modified noisy test sequence N, which is combined with the sound signal S in an adding unit 9 to give a combined signal $S_N$.

Figure 3A:
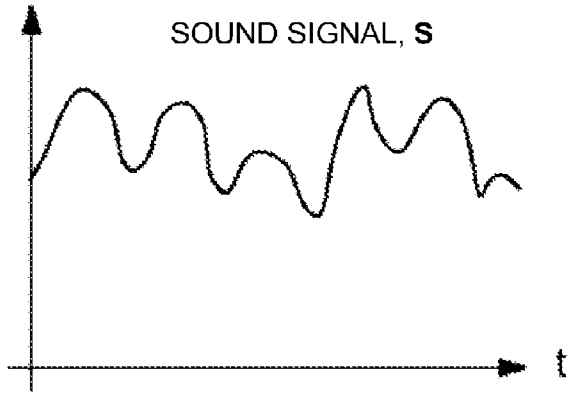
FIG. 3*a* shows a schematic representation of a sound signal.
Figure 3B:
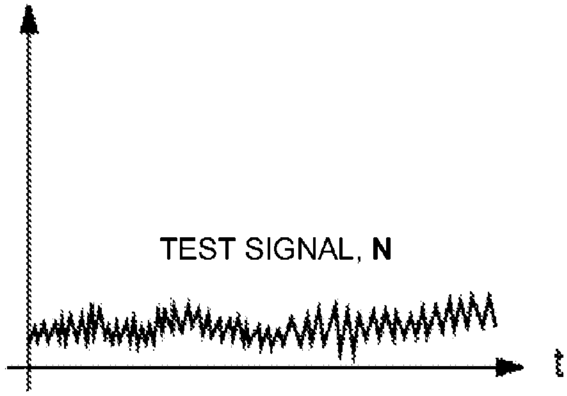
FIG. 3*b* shows a schematic representation of a noise signal.
Figure 3C:
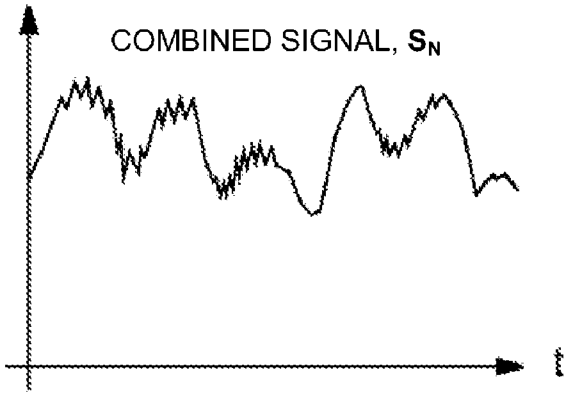
FIG. 3*c* shows a schematic representation of a combined signal.

The signals shown in FIGS. 3*a*-3*c* schematically illustrate a sound signal S, a test signal N, and a combined signal $S_N$, respectively. The resulting combined signal shown in FIG. 3*c*, with greatly exaggerated distortion, is merely intended to show that the combined signal $S_N$ follows the shape of the original sound signal S.

The combined signal $S_N$ emanates from the loudspeaker $L_1$ and is detected by a detecting means $M_2$ associated with the second loudspeaker $L_2$. For the purposes of illustration, the detecting means $M_2$ is shown as a microphone incorporated in the housing of the loudspeaker $L_2$, but the membrane of the loudspeaker $L_2$ itself can be used as the detecting means $M_2$ as will be explained later.

The detected combined signal Z is forwarded to a processing unit 6. The test signal N is also input to this processing unit 6, in which various signal filtering steps are carried out to obtain an acoustic impulse response IR between the first loudspeaker $L_1$ and the detecting means $M_2$ of the second loudspeaker $L_2$. The processing steps which are carried out in the processing unit 6 are shown in the block diagram of FIG.

5*a*. Here, the detected combined signal Z is first buffered and accumulated in buffering unit 51, the purpose of which is to increase the ratio of the test contribution N to the host signal S in the combined signal $S_N$. Then, a Fast Fourier Transformation (FFT) is carried out on the buffered signal in a Fast Fourier Transform block 52. An FFT is also computed for the test sequence N in an FFT unit 53, which also computes the conjugate of the FFT. These computations need only be carried out once since the test sequence N does not change. The outputs of the FFT units 52, 53 are point-wise multiplied with one another in a multiplication block 54 and an inverse FFT is computed for the output of the multiplication block 54 to give the impulse response IR.

Figure 5A:
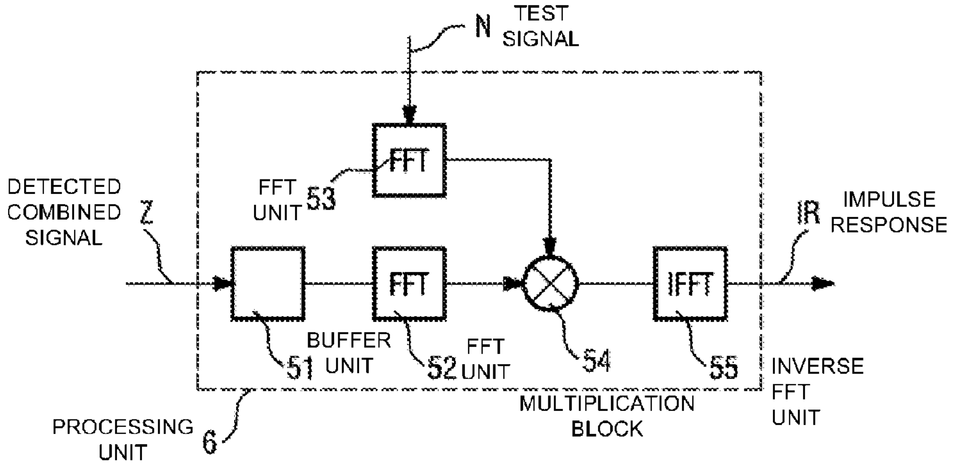
FIG. 5*a* shows a block diagram of a processing unit according to an embodiment of the invention.
Figure 5B:
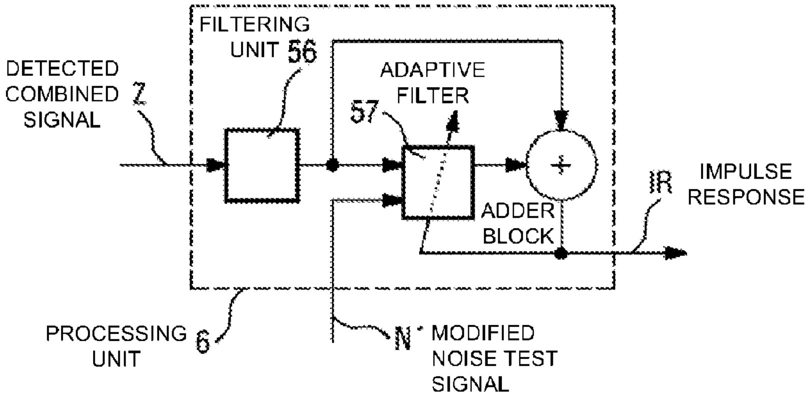
FIG. 5*b* shows a block diagram of a processing unit according to a further embodiment of the invention.

The impulse response IR can be arrived at in an alternative manner in a different type of processing unit, shown in FIG. 5*b*. Here, the processing unit comprises an adaptive filter 57 to continually modify the detected combined signal Z until it approaches the combined signal $S_N$. To this end, the modified noise signal N' is forwarded to the processing unit 6. The detected combined signal Z may be filtered in an appropriate filtering unit 56 before being forwarded to the adaptive filter 57, whose coefficients are continually adapted until they cause the input detected combined signal to be cancelled out. In this way the filter coefficients can yield the impulse response. From this, it is trivial for a person skilled in the art to obtain the delay between the first loudspeaker $L_1$ and the detecting means associated with the second loudspeaker $L_2$.

Figure 4:
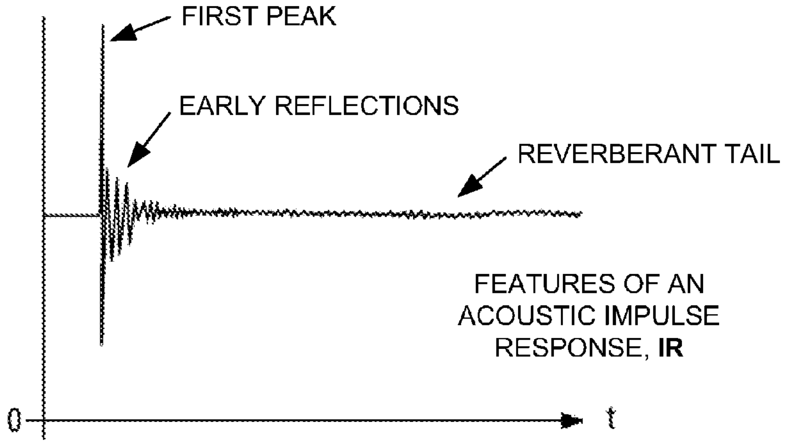
FIG. 4 shows a schematic representation of an acoustic impulse response between a first loudspeaker and a detecting means associated with a second loudspeaker.

For the purposes of illustration, FIG. 4 shows the essential features of an acoustic impulse response between a loudspeaker and a microphone or detecting means. The first peak corresponds to the direct path taken by the sound signal as it travels from the source (first loudspeaker) to the target (detecting means or microphone of the second loudspeaker). Following the direct path are the early reflections, caused by the reflections of the sound waves against the walls of the room or objects in the room before arriving at the detecting means. The final part is the reverberant tail, corresponding to the sound signal and its reflections dying out as they are absorbed by objects in their path.

The time that elapses between issuing the combined signal at the first loudspeaker $L_1$ and detecting it at the detecting means $M_2$ of the second loudspeaker $L_2$ directly corresponds to the time at which the first main peak is registered in the processing unit 6. Typically, this time is measured in samples. Knowing the sampling frequency ("frequency") and the number of samples elapsed until the first main peak has been registered ("peak samples"), and knowing the speed of sound in air ("speed"), it is a simple matter to compute the distance $d_{1,2}$ travelled between the first loudspeaker $L_1$ and the second loudspeaker $L_2$, as given by $$d_{1,2}=\text{speed}*(\text{peak samples}/\text{frequency})$$

This calculation is carried out in a distance determination unit 7. The distance $d_{1,2}$, encoded as an appropriate signal 11, is then forwarded to the rendering unit 10, which can modify the incoming sound signal $S_{in}$ accordingly to improve the overall sound image of the signal $S_N$ to the loudspeaker $L_1$.

FIG. 2*a* only dealt with two loudspeakers, in order to be able to clearly explain the individual elements of the system. Naturally, the system is intended for larger groups of loudspeakers, as shown in FIG. 2*b*. Here, the components of the system are essentially as described in FIG. 2*a* above, but with a number of loudspeakers $L_1, L_2, \ldots, L_k$ and a number of detecting means $M_1, M_2, \ldots, M_k$ associated with the loudspeakers. Here, each loudspeaker $L_1, L_2, \ldots, L_k$ has an associated detecting means $M_1, M_2, \ldots, M_k$, but in reality it is not a requirement for each loudspeaker to have its own detecting means. For example, for k loudspeakers, it suffices that k−1 loudspeakers are equipped with detecting means.

The sound input signal $S_{in}$ to the system comprises a number of sound channel signals, for example, one for each loudspeaker $L_1, L_2, \ldots, L_k$. Similarly, the combined signal $S_N$ collectively represents a number of combined sound channel signals $S_{N1}, S_{N2}, \ldots, S_{Nk}$, one for each loudspeaker $L_1, L_2, \ldots, L_k$. The test signal N supplied by the noise generator 2 can be a single signal or a number of signals, one for each of the channels of the input sound signal $S_{in}$. In the case where the test signal N is a single signal, it is combined with each of the sound channel signals of the collective signal $S_N$ successively, so that only one of the combined sound channel signals $S_{N1}, S_{N2}, \ldots, S_{Nk}$ is issued at a time from the corresponding loudspeaker $L_1, L_2, \ldots, L_k$, while the other loudspeakers issue normal sound signals (not shown in the diagram). Knowing the loudspeaker $L_1, L_2, \ldots, L_k$ from which the current combined sound signal $S_{N1}, S_{N2}, \ldots, S_{Nk}$ is being issued, the pair-wise distances $d_{12}, d_{23}, \ldots d_{k-1,k}$ between the detecting means $M_1, M_2, \ldots, M_k$ of the loudspeakers $L_1, L_2, \ldots, L_k$ and the known loudspeaker $L_1, L_2, \ldots, L_k$ can be calculated as described above in the processing unit 6 and the distance determination unit 7.

Using the computed distances, the distance determination unit 7 can also determine the relative positions of each loudspeaker to the other loudspeakers, also known as the loudspeaker constellation. One numerical method for determining the loudspeaker constellation is described in more detail below. An information signal 11, which can comprise the pair-wise distances $d_{12}, d_{23}, \ldots d_{k-1,k}$ and/or information describing the relative positions of the loudspeakers $L_1, L_2, \ldots, L_k$ is forwarded to the rendering unit 10, which can accordingly modify the input sound channels $S_{in}$ to configure the loudspeaker system. For example, a missing or non-connected loudspeaker can be identified, and its sound channel can be combined with the sound channels for other loudspeakers so that the sound intended for the missing loudspeaker does indeed get issued. In another example of configuration, a pair of left and right loudspeakers that are too close together or too far apart can be identified and their sound input channels modified accordingly, for example by increasing or decreasing the amplitude in the rendering unit 10, as required.

Figure 6:
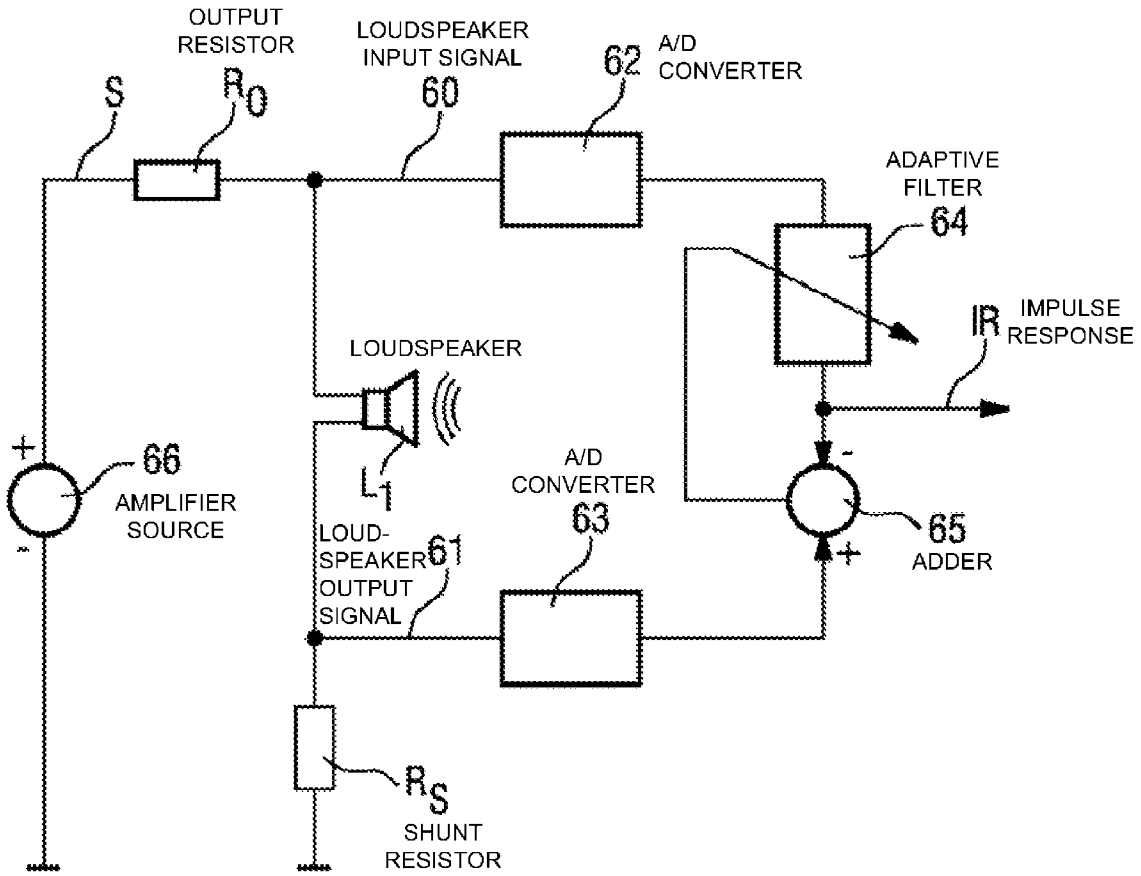
FIG. 6 shows a block diagram of a loudspeaker being used additionally as a microphone.

As explained above, a loudspeaker can also act as a microphone to a certain extent. Sound impinging on the membrane of the loudspeaker is converted to a voltage (albeit quite small), which is effectively the reverse of the "normal" function of a loudspeaker, viz. to convert a voltage into audible sound. This is illustrated in FIG. 6. Here, a loudspeaker $L_1$ is connected in the usual manner via an output resistor $R_O$ to a voltage amplifier 66, and via a shunt resistor $R_S$ to ground. During operation of the loudspeaker $L_1$ as one of a group of loudspeakers all issuing audible sound signals such as music or a film soundtrack, audible sound emanates from $L_1$, and sound emanating from the other loudspeakers (not shown in the diagram) also impinges on the membrane of $L_1$. Therefore, the voltage across the loudspeaker $L_1$ comprises not only the input sound signal but also the contribution of the loudspeaker $L_1$ itself acting as a microphone. The loudspeaker input signal 60 and the loudspeaker output signal 61 can be converted by means of analog-to-digital converters 62, 63 and fed as input and output to an adaptive filter 64. The coefficients of this adaptive filter 64 are continually adjusted until the output of the filter 64 essentially cancels the signal output 61 from the loudspeaker. The coefficients of the adaptive filter 64 then yield the loudspeaker-to-microphone impulse response IR, which can be used to determine the distance between the loudspeaker $L_1$ (acting as microphone) and the loudspeaker from which the received sound has emanated.

A set of pair-wise distances between the loudspeakers of a group of loudspeakers can then be used to determine the actual constellation in which the loudspeakers have been arranged, i.e. how the front loudspeakers are positioned relative to the surround speakers, or how far apart the front and surround speakers are placed, etc. With this knowledge, it is then possible to optimise the sound inputs to the loudspeakers in order to achieve a better listening experience for a listener sitting, for example, centrally to all loudspeakers.

To obtain the loudspeaker constellation, it is necessary to determine a set of coordinates C for the loudspeakers in a coordinate system for the group of loudspeakers. The measured pair-wise distances can be used as parameters in a suitable technique, such as Multi-dimensional Scaling (MDS), outlined briefly in the following. In the MDS technique, any one of the loudspeakers can be chosen to be positioned at the origin, and all other loudspeakers are then viewed relative to the loudspeaker at the origin. A distance matrix D of scalar values can then be constructed, where the diagonal entries $d_{ii}$ are all 0, since the distance between a loudspeaker and itself is 0, and each remaining entry $d_{ij}$ corresponds to the distance between loudspeaker $L_i$ and loudspeaker $L_j$, measured in a manner described above. It follows that diagonally opposite entries $d_{ij}$ and $d_{ji}$ are equal.

Assuming the set of coordinates C of the loudspeakers are known in three-dimensional space for a total of C loudspeakers, the corresponding Gram matrix G (or dot product matrix) can be written as $$G=CC^T \quad (1)$$

where the rows of the matrix C comprise the coordinates $c_i$ of the loudspeakers in three-dimensional space, and $^T$ denotes transposition. Thus, each element $g_{ij}$ of the Gram matrix G correspond to the inner product:

$$g_{ij}=\langle c_i,c_j\rangle \quad (2)$$

Owing to its properties, the Gram matrix G can also be written as $$G=VEV^T \quad (3)$$

where the columns of the matrix V comprise the orthonormal eigenvectors, and the diagonal of the matrix E comprises the associated positive eigenvalues. Since the coordinates which are to be calculated necessarily belong to three-dimensional Cartesian space, the Gram matrix G has at most rank 3, so that at least C-3 eigenvalues are 0. Once a Gram matrix G can be constructed, its eigenvectors and corresponding eigenvalues can be computed, yielding the coordinates of the loudspeakers.

To construct the required Gram matrix G, the law of cosines can be applied to convert the distance matrix D into the Gram matrix G. For example, for the three loudspeakers $L_i$, $L_j$, and $L_k$, the pair-wise distances between them are $d_{ij}$, $d_{ki}$ and $d_{kj}$. From the law of cosines, each of the pair-wise distances can be written in terms of the other two, so that, for example, $$d^2_{ij}=d^2_{kj}+d^2_{kj}-2d_{kj}d_{ki}\cos\alpha \quad (4)$$

Taking loudspeaker $L_k$ as origin, it follows that the corresponding Gram matrix entry $g_{ij}$ is $$g_{ij}=-(d^2_{ij}-d^2_{ki}-d^2_{kj})/2 \quad (5)$$

which elements can be substituted in equation (1) above to construct the Gram matrix G, and subsequently to compute the eigenvalues and eigenvectors of equation (3), ultimately arriving at the coordinates of the loudspeakers. The method is described in more detail in the publication "Multidimensional Scaling: I. Theory and Method" (W. S. Torgerson) issued by *Psychometrika,* 17:401-419, 1952.

Although the present invention has been disclosed in the form of preferred embodiments and variations thereon, it will be understood that numerous additional modifications and variations could be made thereto without departing from the scope of the invention. For example, any appropriate additional filtering can be performed as desired in the signal processing steps described above, in order to obtain better results. The choice of filtering techniques will be clear to a person skilled in the art. Furthermore, the system according to the invention can be combined with one or more techniques for optimising the sound as heard at the position occupied by the user. The user might make his position known to the system, by using any one of a number of available approaches. Knowing the constellation of the loudspeakers with respect to each other, and then also knowing the position of the speaker, the system according to the invention can easily be used to optimise the listening experience for the listener.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method of determining the distance ($d_{12}$) between two loudspeakers ($L_1$, $L_2$), the method comprising:

providing a test signal (N), wherein the test signal (N) comprises white noise in which all frequencies of the white noise are equally represented;

combining the test signal (N) with a sound signal (S) to give a combined signal ($S_N$) in which the test signal is imperceptible to a listener;

issuing the combined signal ($S_N$) by means of a first loudspeaker ($L_1$);

detecting the combined signal ($S_N$) by a detecting means ($M_2$) associated with the second loudspeaker ($L_2$);

processing the detected combined signal (Z) to obtain an acoustic impulse response (IR), wherein processing the detected combined signal (Z) comprises accumulating the received combined signal to increase a ratio of the test signal contribution to the host signal by sampling and storing the detected combined signal in a buffer with the same length as a period of repetition of a test sequence of the test signal; and using the acoustic impulse response (IR) to determine the distance ($d_{1,2}$) between the first loudspeaker ($L_1$) and the second loudspeaker ($L_2$).

2. A method according to claim 1, wherein the test signal (N) is imperceptibly combined with the sound signal ($S_1$) by applying a technique of psycho-acoustic test signal embedding.

3. A method according to claim 1, wherein the step of processing the detected combined signal (Z) to obtain the acoustic impulse response comprises determining a correlation between the detected combined signal (Z) and the test signal (N).

4. A method according to claim 1, wherein the step of processing the detected combined signal (Z) to obtain the acoustic impulse response comprises performing adaptive filtering on the detected combined signal (Z).

5. A method according to claim 1, wherein the test signal (N) is periodically repeated in the step of combining the test signal (N) with the sound signal (S) to give the combined signal ($S_N$).

6. A method according to claim 1, wherein the detecting means ($M_2$) for a loudspeaker ($L_2$) uses the membrane of that loudspeaker ($L_2$) to receive the combined signal incident at that loudspeaker ($L_2$).

7. A method according to claim 1, wherein the pair-wise distances ($d_{1,2}, d_{2,3}, \ldots, d_{k-1,k}$) between the loudspeakers ($L_1, L_2, \ldots, L_k$) of a group of loudspeakers ($L_1, L_2, \ldots, L_k$), are determined, wherein distinct test signals are combined with sound signals to give a number of distinct combined signals which are issued essentially simultaneously, one from each loudspeaker ($L_1, L_2, \ldots, L_k$) of the group, and are received essentially simultaneously by the other loudspeakers ($L_1, L_2, \ldots, L_k$) of the group.

8. A method according to claim 1, wherein the pair-wise distances ($d_{1,2}, d_{2,3}, \ldots d_{k-1,k}$) between the loudspeakers ($L_1, L_2, \ldots, L_k$) of a group of loudspeakers ($L_1, L_2, \ldots, L_k$) are determined, wherein a single test signal (N) is combined with a sound signal (S) to give a number of combined signals, and the resulting combined signals are issued successively by each of the loudspeakers ($L_1, L_2, \ldots, L_k$) of the group, one after the other, and received by the loudspeakers ($L_1, L_2, \ldots, L_k$) in the group, to successively determine the pair-wise distances ($d_{1,2}, d_{2,3}, \ldots d_{k-1,k}$) between each loudspeaker ($L_1, L_2, \ldots, L_k$) and the other loudspeakers ($L_1, L_2, \ldots, L_k$) in the group.

9. A method of determining the relative positions of the loudspeakers ($L_1, L_2, \ldots, L_k$) of a group of loudspeakers ($L_1, L_2, \ldots, L_k$) wherein the pair-wise distances ($d_{1,2}, d_{2,3}, \ldots d_{k-1,k}$) between the loudspeakers ($L_1, L_2, \ldots, L_k$) are determined according to claim 8, and wherein the pair-wise distances ($d_{1,2}, d_{2,3}, \ldots d_{k-1,k}$) are used to determine the relative positions of the loudspeakers ($L_1, L_2, \ldots, L_k$) of the group.

10. A method of automatic configuring of a group of loudspeakers ($L_1, L_2, \ldots, L_k$), wherein the relative positions of the loudspeakers ($L_1, L_2, \ldots, L_k$) are determined according to claim 9, and wherein information regarding the relative positions of the loudspeakers ($L_1, L_2, \ldots, L_k$) of the group of loudspeakers ($L_1, L_2, \ldots, L_k$) is used to automatically configure the loudspeakers ($L_1, L_2, \ldots, L_k$).

11. A system for determining the distance ($d_{12}$) between two loudspeakers ($L_1, L_2$), comprising:

a test signal source for providing a test signal (N), wherein the test signal (N) comprises white noise in which all frequencies of the white noise are equally represented;

a signal combining unit for combining a sound signal (S) with the test signal (N) to give a combined signal ($S_N$) in which the test signal is imperceptible to a listener;

outputting means for outputting the combined signal ($S_N$) to a first loudspeaker ($L_1$);

a detecting means ($M_2$) for detecting the combined signal ($S_N$) emanating from the first loudspeaker ($L_1$) and incident at the second loudspeaker ($L_2$);

a processing unit for processing the detected combined signal (Z) to obtain an impulse response (IR), wherein processing the detected combined signal (Z) comprises accumulating the received combined signal to increase a ratio of the test signal contribution to the host signal by sampling and storing the detected combined signal in a buffer with the same length as a period of repetition of a test sequence of the test signal; and a distance determination unit for using the impulse response (IR) to determine the distance ($d_{12}$) between the first loudspeaker ($L_1$) and the second loudspeaker ($L_2$).

12. A system according to claim 11, wherein the signal combining unit comprises a psycho-acoustic embedding unit for applying a psycho-acoustic technique to embed the test signal (N) into the sound signal (S).

13. An acoustic sound system, comprising a number of loudspeakers ($L_1, L_2, \ldots, L_k$) for reproduction of multichannel sound, and a system according to claim 12 for determining the distances ($d_{1,2}, d_{2,3}, \ldots d_{k-1,k}$) between the loudspeakers ($L_1, L_2, \ldots, L_k$) and a system for automatic configuration of the loudspeakers ($L_1, L_2, \ldots, L_k$) for that acoustic sound system.

* * * * *